(12) United States Patent
Takada et al.

(10) Patent No.: US 6,221,141 B1
(45) Date of Patent: Apr. 24, 2001

(54) INK, INK-JET RECORDING PROCESS, RECORDING UNIT, INK CARTRIDGE AND INK-JET RECORDING APPARATUS

(75) Inventors: Yoichi Takada, Yokohama; Yoshihisa Takizawa, Machida; Shinya Mishina, Kawasaki; Mikio Sanada, Yokohama; Hisashi Teraoka; Koichi Osumi, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/334,560

(22) Filed: Jun. 21, 1999

(30) Foreign Application Priority Data

Jun. 23, 1998 (JP) .................................... 10-175912

(51) Int. Cl.$^7$ .................................................. C09D 11/02
(52) U.S. Cl. .................. 106/31.6; 106/31.75; 106/31.77; 106/31.89; 106/475
(58) Field of Search ............................. 106/31.6, 31.75, 106/31.77, 31.89, 31.9, 475

(56) References Cited

U.S. PATENT DOCUMENTS

| 5,053,495 | 10/1991 | Greenwood et al. | 534/829 |
|---|---|---|---|
| 5,356,464 | 10/1994 | Hickman et al. | 106/31.58 |
| 5,554,739 | 9/1996 | Belmont | 534/885 |
| 5,571,311 | 11/1996 | Belmont et al. | 106/31.75 |
| 5,672,198 | 9/1997 | Belmont | 106/31.75 |
| 5,746,818 | 5/1998 | Yatake | 106/31.86 |
| 5,749,950 | * 5/1998 | Mahmud et al. | 106/31.6 |
| 5,762,695 | 6/1998 | Wong et al. | 106/31.89 |
| 5,854,308 | * 12/1998 | Kuo et al. | 523/161 |
| 5,968,244 | * 10/1999 | Ueda et al. | 106/31.86 |
| 5,972,087 | * 10/1999 | Uraki et al. | 106/31.89 |
| 5,976,233 | 11/1999 | Osumi et al. | 106/31.86 |

FOREIGN PATENT DOCUMENTS

| 0 586 101 A1 | 3/1994 | (EP) . |
|---|---|---|
| 0 842 994 A1 | 5/1998 | (EP) . |
| 4-226175 | 8/1992 | (JP) . |
| 5-179183 | 7/1993 | (JP) . |
| 6-136311 | 5/1994 | (JP) . |
| 7-53841 | 2/1995 | (JP) . |
| WO 97/31984 | 9/1997 | (WO) . |

* cited by examiner

*Primary Examiner*—Helene Klemanski
(74) *Attorney, Agent, or Firm*—Fitzpatrick, Cella, Harper & Scinto

(57) ABSTRACT

Disclosed herein is a pigment ink comprising self-dispersing type carbon black to the surface of which at least one hydrophilic group is bonded through another atomic group, an aqueous medium, and a silicon compound. The pigment ink can form images excellent in fastness properties such as water fastness and light fastness and character quality, can be efficiently ejected when applied to ink-jet recording and can also be stably ejected from a recording head irrespective of recording head and printing environment.

18 Claims, 4 Drawing Sheets

INK, INK-JET RECORDING PROCESS, RECORDING UNIT, INK CARTRIDGE AND INK-JET RECORDING APPARATUS

BACKGROUND OF THE INVENTION

1. Field of the Invention

The present invention relates to a pigment ink, an ink-jet recording process, a recording unit, an ink cartridge and an ink-jet recording apparatus.

2. Related Background Art

With the spread of ink-jet recording systems, it has become a priority to improve the quality and fastness properties of prints. With respect to fastness properties of prints, for example, water fastness, Japanese Patent Application Laid-Open No. 4-226175 and U.S. Pat. No. 5,053,495 disclose novel black dyes and inks which can provide images having good water fastness.

Black inks using a pigment have been reported to form black images excellent in print quality and fastness properties such as water fastness and light fastness on plain paper.

For example, Japanese Patent Application Laid-Open No. 5-179183 discloses a pigment ink stabilized with a block copolymer of the AB or BAB type. Japanese Patent Application Laid-Open No. 6-136311 discloses a pigment ink which comprises a block copolymer composed of a hydrophobic polymer having a basic amine functional group and a hydrophilic polymer having nonionic and acidic functional groups, which can provide prints of excellent quality and has excellent dispersion stability. Japanese Patent Application Laid-Open No. 7-53841 has proposed a pigment ink for ink-jet, which comprises a triblock copolymer of the ABC type, has excellent dispersion stability and can provide prints of excellent quality.

On the other hand, pigment inks using, as a coloring material, the so-called self-dispersing type carbon black, which does not require the addition of any dispersing agent to the inks, have been proposed with a view toward improving the ejection stability thereof upon ink-jet recording. For example, U.S. Pat. Nos. 5,554,739 and 5,571,311 disclose a production process of self-dispersing type carbon black to the surface of which at least one hydrophilic group is bonded directly or through another atomic group. A pigment ink comprising such self-dispersing type carbon black can provide prints of excellent quality and has excellent dispersion stability without using any block copolymer.

SUMMARY OF THE INVENTION

The present inventors have carried out various investigations as to ink-jet suitability of pigment inks comprising such self-dispersing type carbon black as a coloring material. As a result, it has been found that when a silicon compound is contained in such an ink, fluctuation in the ejection efficiency of the ink can be reduced, thereby effectively preventing the ejection quantity of the ink from varying with individual heads and printing environment.

It is an object of the present invention to provide a pigment ink which can form images excellent in fastness properties, such as water fastness and light fastness, and character quality, which can be efficiently ejected when applied to ink-jet recording and moreover can be stably ejected from a recording head irrespective of recording head and printing environment.

Another object of the present invention is to provide an ink-jet recording process which permits the stable formation of images excellent in water fastness and light fastness that are of high quality.

A further object of the present invention is to provide a recording unit, ink cartridge and ink-jet recording apparatus which permit the stable provision of images excellent in water fastness and light fastness that are of high quality by ink-jet recording.

Incidentally, the ejection efficiency as used herein means a proportion of thermal energy converted into the kinetic energy of an ink.

The above objects can be achieved by the present invention described below.

According to the present invention, there is thus provided a pigment ink comprising self-dispersing type carbon black to the surface of which at least one hydrophilic group is bonded through another atomic group, an aqueous medium, and a silicon compound.

According to the present invention, there is also provided an ink-jet recording process, comprising the step of applying energy to a pigment ink comprising self-dispersing type carbon black to the surface of which at least one hydrophilic group is bonded through another atomic group, an aqueous medium, and a silicon compound to eject the pigment ink from an orifice toward a recording medium.

According to the present invention, there is further provided a recording unit comprising an ink container portion containing an ink, and a head portion from which the ink is ejected, wherein said ink is a pigment ink comprising self-dispersing type carbon black to the surface of which at least one hydrophilic group is bonded through another atomic group, an aqueous medium, and a silicon compound.

According to the present invention, there is still further provided an ink cartridge comprising an ink container portion containing an ink, wherein said ink is a pigment ink comprising self-dispersing type carbon black to the surface of which at least one hydrophilic group is bonded through another atomic group, an aqueous medium, and a silicon compound.

According to the present invention, there is yet still further provided an ink-jet recording apparatus comprising a recording unit, wherein the recording unit has an ink container portion containing a pigment ink comprising self-dispersing type carbon black to the surface of which at least one hydrophilic group is bonded through another atomic group, an aqueous medium, and a silicon compound; and a recording head for applying energy to the ink to eject the ink from an orifice.

According to the present invention, there is yet still further provided an ink-jet recording apparatus comprising an ink cartridge equipped with an ink container portion which contains a pigment ink comprising self-dispersing type carbon black to the surface of which at least one hydrophilic group is bonded through another atomic group, an aqueous medium, and a silicon compound; and a recording head for applying energy to the pigment ink to eject the ink from an orifice.

According to the present invention, there is yet still further provided a pigment ink comprising self-dispersing type carbon black to the surface of which at least one hydrophilic group is bonded through another atomic group, an aqueous medium, and a silicon atom.

By adopting such constitution, there can be brought about an effect that images excellent in fastness properties such as water fastness and light fastness that are of high quality can be stably formed in ink-jet recording.

The reason why the water-based pigment inks according to the present invention exhibit the above-described effect, and particularly, can achieve excellent ejection efficiency and can be stably ejected upon ink-jet recording is not known. However, the present inventors have already found that when a uniform film of a pigment is formed on the surface of a heater upon ejection of a pigment ink by a bubble jet system (a system where thermal energy is applied to an ink using a heater to eject the ink from an orifice), the bubbling of the ink can be stabilized to achieve high ejection efficiency, and that impurities in a pigment ink comprising self-dispersing type carbon black to the surface of which at least one hydrophilic group is bonded through another atomic group, particularly, impurities derived from the self-dispersing type carbon black to the surface of which at least one hydrophilic group is bonded through another atomic group, aid in ejection efficiency and ejection stability. It is thus considered from these findings that the effect of the present invention is achieved by the following action. Namely, for example, in the ink-jet recording system where thermal energy is applied to an ink to eject the ink, voltage is applied to a heater to rapidly heat up the heater, whereby the ink adjacent to the surface of the heater reaches the limit of heating to generate bubbles, thereby ejecting the ink. The generation of bubbles tends to be affected by the heater surface condition, and so the ejection of the ink is greatly influenced by the condition of the heater surface. In the pigment inks according to the present invention, a uniform thin film of a pigment is stably formed on the heater surface by the interaction between the silicon compound and the above-described impurities in the pigment inks, and so the bubbling is stabilized. As a result, high ejection efficiency is achieved, and fluctuation in the ejection quantity of the ink with individual heads and the effects of the recording environment are minimized.

DETAILED DESCRIPTION OF THE PREFERRED EMBODIMENTS

Figure 1:
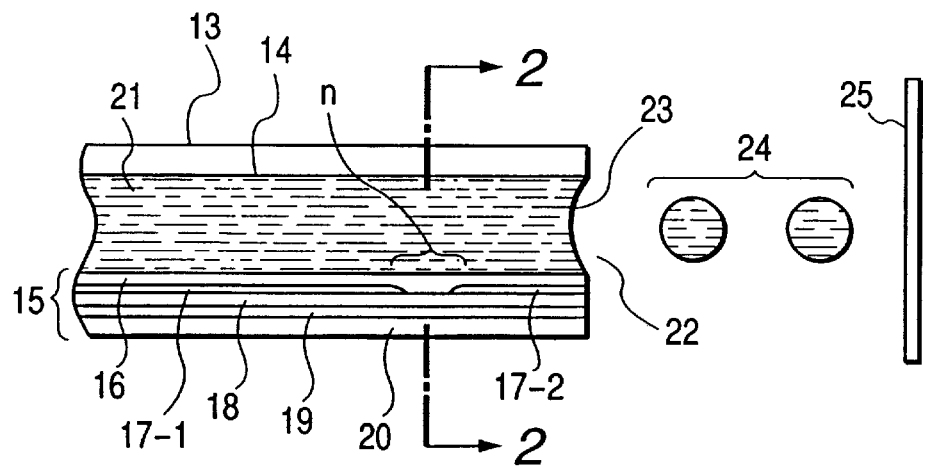
FIG. 1 is a longitudinal cross-sectional view of an embodiment of a head of an ink-jet recording apparatus.

The present invention will hereinafter be described in detail by the preferred embodiments of the invention.

A feature of the pigment inks in one embodiment of the present invention resides in that the inks comprise self-dispersing type carbon black to the surface of which at least one hydrophilic group is bonded through another atomic group, an aqueous medium, and a silicon compound. The individual components of the pigment inks according to the present invention will hereinafter be described in order.

(Self-dispersing type carbon black)

In the water-based pigment inks according to the present invention, it is preferred that self-dispersing type carbon black to the surface of which at least one hydrophilic group is bonded through another atomic group be contained as a coloring material. The use of such carbon black as the coloring material makes it unnecessary to add a dispersing agent for dispersing carbon black like the conventional pigment inks. The self-dispersing type carbon black preferably has an ionicity in view of its dispersibility in the ink, and preferably the ink is anionically or cationically charged.

(Anionic hydrophilic group)

In the case of the anionically charged carbon black, examples of the hydrophilic group bonded to the surface thereof through another atomic group include —COOM, —$SO_3M$, —$PO_3HM$ and —$PO_3M_2$, wherein M is hydrogen, alkali metal, ammonium or organic ammonium. Anionically charged self-dispersing type carbon black with either —COOM or —$SO_3M$ bonded to the surface thereof through another atomic group is particularly preferably used because its dispersibility in the ink is good. With respect to "M" in the above-described hydrophilic groups, examples of the alkali metal include lithium, sodium and potassium, and examples of the organic ammonium include mono-, di- and trimethyl-ammonium, mono-, di- and triethylammonium, and mono-, di- and trimethanolammonium.

As to a method for preparing the anionically charged self-dispersing type carbon black, an example of a method for bonding an —Ar—COONa group, wherein Ar denotes an aryl group, to the surface of carbon black includes a method in which nitrous acid is caused to act on an $NH_2$—Ar—COONa group to bond such a group as a diazonium salt to the surface of carbon black. It goes without saying that the present invention is not limited to this method.

(Cationic hydrophilic group)

Examples of the cationically charged carbon black include those with at least one hydrophilic group selected from among the following quaternary ammonium groups bonded to the surface of carbon black.

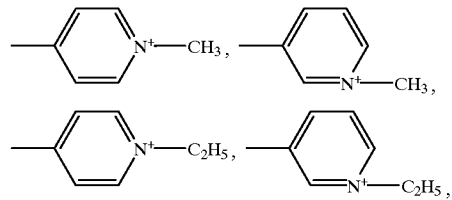

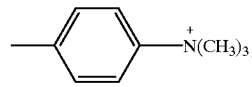

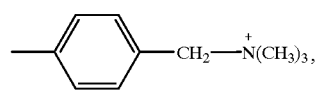

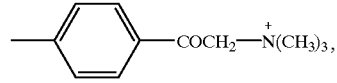

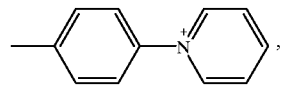

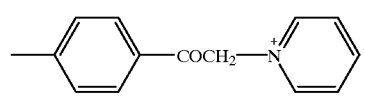

wherein R is an alkyl group having 1 to 12 carbon atoms, a substituted or unsubstituted phenyl group, or a substituted or unsubstituted naphthyl group.

As to a method for preparing the cationically charged self-dispersing type carbon black with such a hydrophilic group bonded to the surface thereof, a description is given taking the case of a method for bonding, for example, an N-ethylpyridyl group of the structure described below to the surface of carbon black.

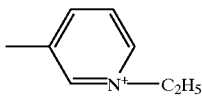

Namely, there is mentioned a method in which carbon black is treated with 3-amino-N-ethylpyridinium bromide. It goes without saying that the present invention is not limited to this method. The carbon black that is anionically or cationically charged by introducing one of the above-described hydrophilic groups onto the surface thereof as described above has excellent dispersibility in water by virtue of repulsion of the ion thereof, and hence stably retains its dispersed state without adding any dispersing agent even when it is contained in a water-based ink.

By the way, it is preferred that such various hydrophilic groups as mentioned above be bonded to a polymer chain of carbon atoms through another atomic group. Examples of said another atomic group include linear or branched alkylene groups having 1 to 12 carbon atoms, a substituted or unsubstituted phenylene group, and a substituted or unsubstituted naphthylene group. Examples of substituent groups on the phenylene group and the naphthylene group include linear or branched alkylene groups having 1 to 6 carbon atoms. Specific examples of the combination of another atomic group and the hydrophilic group include —$C_2H_4$COOM, —PhSO$_3$M and PhCOOM, wherein Ph is a phenyl group. It goes without saying that the present invention is not limited to these combinations.

In the present invention, the self-dispersing type carbon black is not limited to one kind, and two or more kinds of such carbon black may be used in combination to control the color tone of the ink. The amount of the self-dispersing type carbon black to be added in the pigment inks according to the present invention is preferably within the range of from 0.1 to 15% by weight, more preferably from 1 to 10% by weight based on the total weight of each ink. When the self-dispersing type carbon black is added within this range, its satisfactorily dispersed state can be retained in the inks. In addition to the self-dispersing type carbon black, a dye or the like may be added for the purpose of controlling the color tone of the inks.

(Aqueous medium)

The aqueous medium contained in the water-based pigment inks according to the present invention is composed of a mixed solvent of water and a water-soluble organic solvent. It is particularly preferred that the water-soluble organic solvent should have an effect of preventing the drying of the inks. With respect to the water, it is desirable to use deionized water instead of tap water containing various ions. Specific examples of the water-soluble organic solvent include alkyl alcohols having 1 to 4 carbon atoms, such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones and ketone alcohols such as acetone and diacetone alcohol; ethers such as tetrahydrofuran and dioxane; polyalkylene glycols such as polyethylene glycol and polypropylene glycol; alkylene glycols the alkylene moiety of which has 2 to 6 carbon atoms, such as ethylene glycol, propylene glycol, butylene glycol, triethylene glycol, thiodiglycol, hexylene glycol and diethylene glycol; lower alkyl ether acetates such as polyethylene glycol monomethyl ether acetate; 1,2,6-hexanetriol; glycerol; lower alkyl ethers of polyhydric alcohols, such as ethylene glycol monomethyl (or monoethyl) ether, diethylene glycol methyl (or ethyl) ether and triethylene glycol monomethyl (or monoethyl) ether; polyhydric alcohols such as trimethylolpropane and trimethylolethane; N-methyl-2-pyrrolidone; 2-pyrrolidone; and 1,3-dimethyl-2-imidazolidinone. The water-soluble organic solvents mentioned above may be used either singly or in any combination thereof.

No particular limitation is imposed on the content of such water-soluble organic solvents in the water-base pigment inks according to the present invention. However, it is preferably within a range of from 3 to 50% by weight based on the total weight of each ink. On the other hand, the content of water contained in the inks is preferably within a range of from 50 to 95% by weight based on the total weight of each ink.

(Silicon compound)

Preferable examples of the silicon compound include those having high affinity for the above-described aqueous medium. Examples thereof include:

1. silicon-containing surfactants such as those obtained by adding ethylene oxide and propylene oxide to the side chains of dimethyl silicone and those obtained by substituting them with a polyether such as polyoxyethylene alkyl phenyl ether; and 2. silicon compounds obtained by emulsifying dimethyl polysiloxane, carboxy-modified silicone, phenylmethyl silicone, and the like with an emulsifying agent.

However, the present invention is not limited to these compounds. These silicon compounds may be used either singly or in any combination thereof.

(Content of silicon compound)

The content of the silicon compound in the water-based pigment ink varies depending on the silicon compound. However, the compound is preferably contained in such a range that the concentration of Si in the ink amounts to 0.2 to 100 ppm, preferably 0.2 to 70 ppm, and most preferably 0.2 to 50 ppm, since the effect of improving the ejection efficiency and ejection stability of the pigment ink containing the self-dispersing type carbon black is brought about at this concentration range, and moreover the storage stability of the ink is not adversely affected.

When a silicon compound the molecular weight of which is not known is contained in an ink, it is only necessary to analyze the ink by means of a plasma emission spectroscopic analyzer to add such a compound in such a manner that the concentration of Si in the ink falls within the above range.

(Other components)

The water-based pigment inks according to the present invention may contain, in addition to the above-described components, a surfactant, antifoaming agent, antiseptic, mildewproofing agent, and the like, as needed, to obtain inks having desired physical properties. Further, a commercially-available water-soluble dye or the like may be added.

As the surfactant, there may be used one selected from among anionic surfactants, nonionic surfactants and cationic surfactants.

(Ink-jet ejection properties of ink)

The inks according to the present invention may be used as inks for writing utensils and ink-jet recording. Ink-jet recording methods include a recording method in which mechanical energy is applied to an ink to eject droplets of the ink, and a recording method in which thermal energy is applied to an ink to eject droplets of the ink by bubbling of the ink. The inks according to the present invention may be preferably used in these recording methods. In particular, the effect of these inks can be enjoyed best when they are used in the recording method using thermal energy. When the inks are used for ink-jet recording, it is preferable for the inks to have such properties that they can be ejected from an ink-jet head. From the viewpoint of the ejectability from the ink-jet head, the inks according to the present invention may desirably be controlled so as to have, as their own physical properties, a viscosity of 1 to 15 cP and a surface tension of 25 dyn/cm or more, and preferably a viscosity of 1 to 5 cP and a surface tension of 25 to 50 dyn/cm. Preferable examples of the composition of an aqueous medium, which can impart such properties to the inks according to the respective embodiments described above, include those comprising glycerol, trimethylolpropane, thiodiglycol, ethylene glycol, diethylene glycol, triethylene glycol, isopropyl alcohol and acetylene alcohol. As examples of the acetylene alcohol, acetylene alcohols represented by the chemical formula may be used

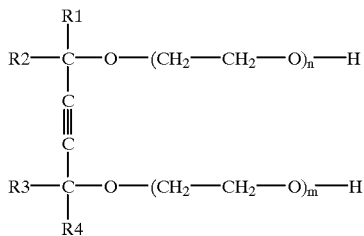

wherein R1, R2, R3 and R4 are each alkyl group, specifically, a linear or branched alkyl groups having 1 to 4 carbon atoms, and m and n are both integers, with the proviso that m =0 and n=0, or $1 \leq m+n \leq 30$, and m or n is 0 when m+n=1.

(Ink-jet recording apparatus)

Figure 2:
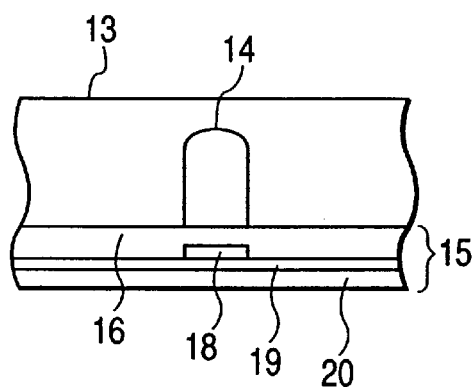
FIG. 2 is a cross-sectional view of the head taken along line 2—2 in FIG. 1.
Figure 3:
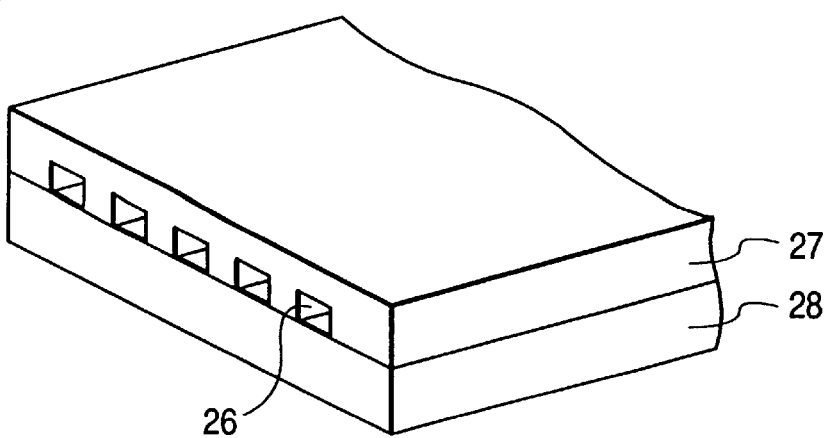
FIG. 3 schematically illustrates a multi-head.

As an ink-jet recording apparatus, examples of the construction of a head, which is a main component of an ink-jet recording apparatus making good use of thermal energy, are first illustrated in FIGS. 1, 2 and 3. FIG. 1 is a cross-sectional view of a head 13 taken along the flow path of an ink 21, and FIG. 2 is a cross-sectional view taken along line 2—2 in FIG. 1. The head 13 is formed by bonding a glass, ceramic, silicon or plastic plate or the like having a flow path (nozzle) 14 through which the ink 21 is passed, to a heating element base 15. The heating element base 15 is composed of a protective layer 16 formed with silicon oxide, silicon nitride, silicon carbide or the like, electrodes 17-1 and 17-2 made of aluminum, gold, aluminum-copper alloy, or the like, a heating resistor layer 18 formed from a high-melting-point material such as $HfB_2$, TaN or TaAl, a heat accumulating layer 19 formed with thermally oxidized silicon, aluminum oxide or the like, and a substrate 20 formed with silicon, aluminum, aluminum nitride, or the like having good heat radiating properties.

Upon application of electric pulse signals to the electrodes 17-1 and 17-2 in the head 13, the heating element base 15 rapidly generates heat in the region shown by n to form bubbles in the ink 21 which is in contact with the surface of this region. A meniscus 23 of the ink 21 is projected by the action of the pressure thus produced, and the ink 21 is ejected through the nozzle 14 of the head to fly out of an ejection orifice 22 toward a recording medium 25 in the form of ink droplets 24.

FIG. 3 illustrates an appearance of a multi-head composed of an array of a number of heads as shown in FIG. 1. The multi-head is formed by bonding a glass plate 27 having a multiple nozzles 26 to a heating head 28 similar to the head as illustrated in FIG. 1.

Figure 4:
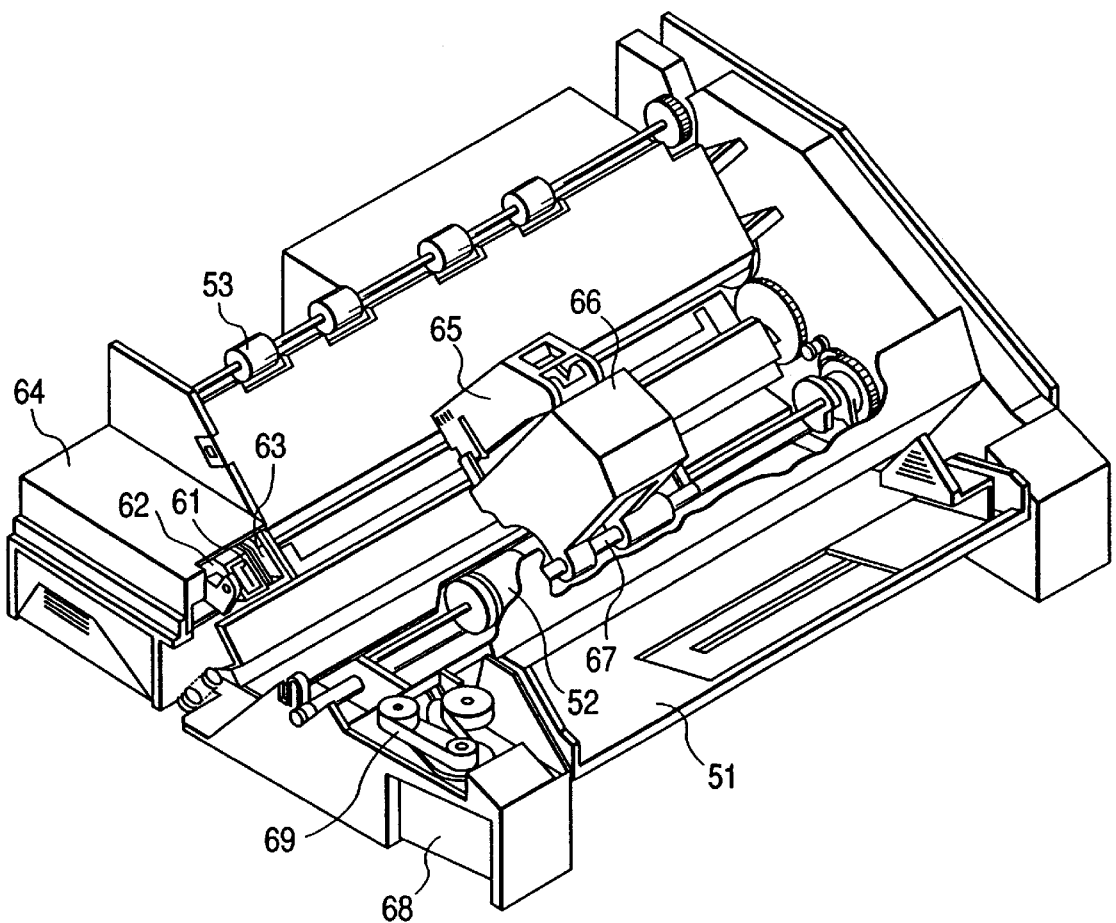
FIG. 4 is a schematic perspective view of an embodiment of an ink-jet recording apparatus.

FIG. 4 illustrates an example of an ink-jet recording apparatus into which such a head has been incorporated. In FIG. 4, reference numeral 61 designates a blade serving as a wiping member, one end of which is held and fixed by a blade-holding member to form a cantilever. The blade 61 is provided at a position adjacent to a region in which a recording head 65 operates, and in this embodiment, is held in such a way that it protrudes into the course through which the recording head 65 is moved. Reference numeral 62 indicates a cap for the face of the ejection openings of the recording head 65, which is provided at the home position adjacent to the blade 61, and is so designed so that it moves in the direction perpendicular to the direction in which the recording head 65 is moved and comes into contact with the face of the ejection openings to cap them. Reference numeral 63 denotes an ink-absorbing member provided adjacent to the blade 61 and, similar to the blade 61, held in such a way that it protrudes into the course through which the recording head 65 is moved. The above-described blade 61, cap 62 and ink-absorbing member 63 constitute an ejection-recovery portion 64, where the blade 61 and ink-absorbing member 63 remove water, dust and/or the like from the face of the ejection openings. Reference numeral 65 designates the recording head having an ejection-energy-generating means and serving to eject the ink onto a recording medium set in an opposing relation to the ejection opening face provided with ejection openings to conduct recording. Reference numeral 66 indicates a carriage on which the recording head 65 is mounted so that the recording head 65 can be moved. The carriage 66 is slidably interlocked with a guide shaft 67 and is connected (not illustrated) to a belt 69 driven by a motor 68. Thus, the carriage 66 can be moved along the guide shaft 67 and hence, the recording head 65 can be moved from a recording region to a region adjacent thereto. Reference numerals 51 and 52 denote a feeding part into which the recording media are separately inserted, and feed rollers driven by a motor (not illustrated), respectively.

With such a construction, the recording medium is fed to the position opposite to the ejection opening face of the recording head 65, and discharged from a discharge section provided with discharge rollers 53 with the progress of recording. In the above construction, the cap 62 in the head recovery portion 64 is receded from the path of motion of the recording head 65 when the recording head 65 is returned to its home position after completion of recording, and the blade 61 remains protruded into the path of motion. As a result, the ejection opening face of the recording head 65 is wiped. When the cap 62 comes into contact with the ejection opening face of the recording head 65 to cap it, the cap 62 is moved so as to protrude into the path of motion of the recording head 65. When the recording head 65 is moved from its home position to the position at which recording is started, the cap 62 and the blade 61 are at same positions as the for the wiping described above. As a result, the ejection opening face of the recording head 65 is also wiped at the time of this movement.

The above movement of the recording head 65 to its home position is made not only when the recording is completed or the recording head 65 is recovered for ejection, but also when the recording head 65 is moved between recording regions for the purpose of recording, during which it is moved to the home position adjacent to each recording region at given intervals, where the ejection opening face is wiped in accordance with this movement.

Figure 5:
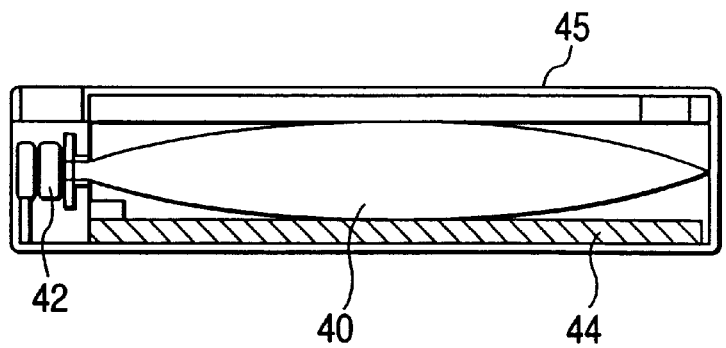
FIG. 5 is a longitudinal cross-sectional view of an embodiment of an ink cartridge.

FIG. 5 illustrates an exemplary ink cartridge 45 in which an ink to be fed to a recording head through an ink-feeding member (not illustrated), for example, a tube, is contained. Here, reference numeral 40 designates an ink container portion containing the ink to be fed, as exemplified by a bag for the ink. One end thereof is provided with a stopper 42 made of rubber. A needle (not illustrated) may be inserted into this stopper 42 so that the ink in the bag 40 for the ink can be fed to the head. Reference numeral 44 indicates an ink-absorbing member for receiving a waste ink. It is preferred that the ink container portion be formed of a polyolefin, in particular, polyethylene, at the surface with which the ink comes into contact.

Figure 6:
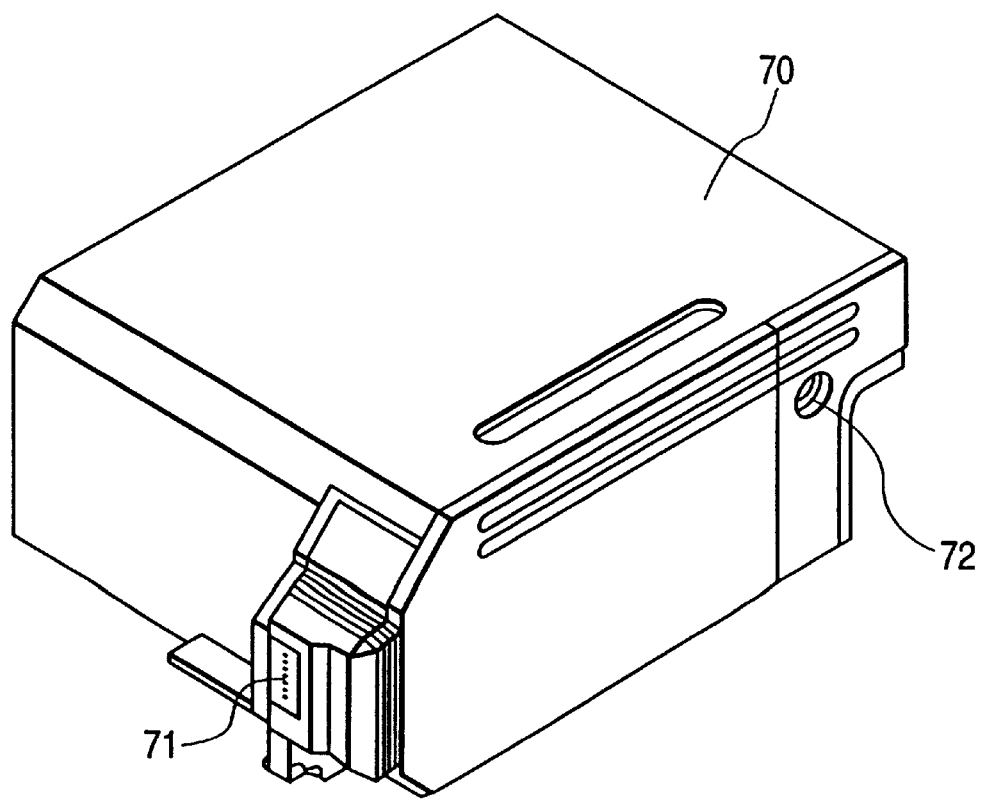
FIG. 6 is a perspective view illustrating an exemplary recording unit.

The ink-jet recording apparatus used in the present invention are not limited to the apparatus as described above in which the head and the ink cartridge are separately provided. Therefore, a device in which these members are integrally formed as shown in FIG. 6 can also be preferably used. In FIG. 6, reference numeral 70 designates a recording unit, in the interior of which an ink container portion containing an ink, for example, and an ink-absorbing member, is contained. The recording unit 70 is so constructed that the ink in such an ink-absorbing member is ejected in the form of ink droplets through a head portion 71 having a plurality of orifices. In the present invention, polyurethane is preferably used as a material for the ink-absorbing member.

The recording unit 70 may be so constructed that the ink container portion is a bag for the ink in the interior of which a spring or the like is provided, not the ink-absorbing member. Reference numeral 72 indicates an air passage for communicating the interior of the recording unit 70 with the atmosphere. This recording unit 70 can be used in place of the recording head 65 shown in FIG. 4, and is detachably installed on the carriage 66.

Figure 7:
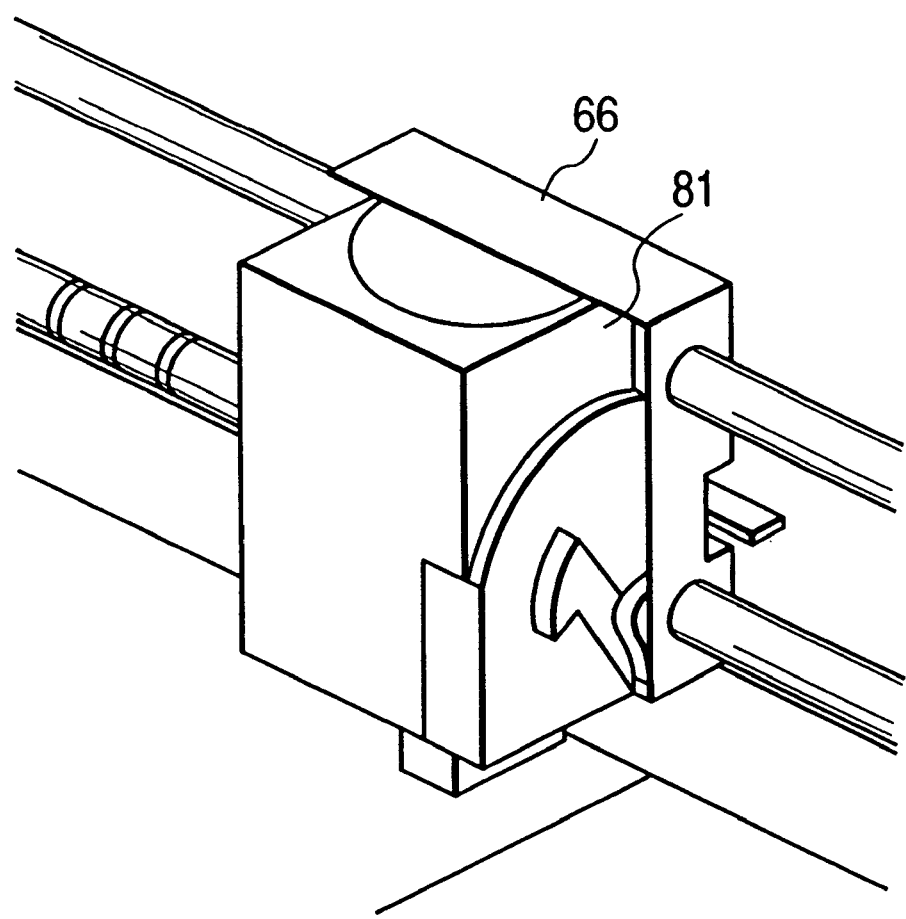
FIG. 7 is a schematic perspective view illustrating a recording head that has been mounted on a carriage of an ink-jet printer.

When the ink-jet recording process according to the present invention is carried out, an ink-jet printer on a carriage of which, for example, the recording head illustrated in FIG. 3 has been mounted is used. FIG. 7 is a schematic perspective view illustrating an example thereof. In FIG. 7, reference numerals 66 and 81 indicate a carriage and a recording head from which a pigment ink is ejected, respectively. The ink is ejected from this recording head toward a recording medium in response to recording signals.

As described above, the inks according to the present invention can provide images excellent in character quality and fastness properties such as water fastness and light fastness, and moreover can achieve high ejection efficiency and can be ejected in a stable ejection quantity. As a result, ink-jet recorded images excellent in fastness properties such as water fastness and light fastness and high in quality can be stably formed.

The present invention will hereinafter be described more specifically by the following Examples and Comparative Examples. However, the present invention is not limited by these examples so far as the subject matter of the present invention is not overstepped. Incidentally, all designations of "part" or "parts" and "%" as will be used in the following examples mean part or parts by weight, and % by weight unless expressly noted.

Pigment Dispersion 1:

After 10 g of carbon black having a surface area of 230 m$^2$/g and a DBP oil absorption of 70 ml/100 g and 3.41 g of p-aminobenzenesulfonic acid were thoroughly mixed with 72 g of water, 1.62 g of nitric acid was added dropwise to the mixture, followed by stirring at 70° C. After several minutes, a solution of 1.07 g of sodium nitrite in 5 g of water was further added to the mixture, and the resultant mixture was stirred for an additional 1 hour. The resultant slurry was filtered through Toyo Filter Paper No. 2 (product of Advantes Co.), and the resultant pigment particles were fully washed with water and dried in an oven controlled to 90° C. Additional water was added to the dried pigment to prepare an aqueous dispersion of the pigment having a pigment concentration of 10%. The above-described process was followed to introduce a group represented by the chemical formula

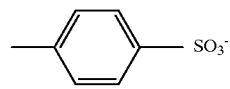

onto the surface of the carbon black.

Pigment Dispersion 2:

To a solution of 5 g of concentrated hydrochloric acid in 5.3 g of water, 1.58 g of anthranilic acid at 5° C. was added. The mixture was stirred in an ice bath, thereby always holding it at 10° C. or lower. In this state, a solution with 1.78 g of sodium nitrite dissolved in 8.7 g of water at 50C was added. After stirring the resultant mixture for 15 minutes, 20 g of carbon black having a surface area of 320 m$^2$/g and a DBP oil absorption of 120 ml/100 g was further added to the mixture with stirring. The resultant mixture was stirred for an additional 15 minutes. The resultant slurry was filtered through Toyo Filter Paper No. 2 (product of Advantes Co.), and the resultant pigment particles were fully washed with water and dried in an oven controlled to 110° C. Additional water was added to the dried pigment to prepare an aqueous dispersion of the pigment having a pigment concentration of 10%. The above-described process was followed to introduce a group represented by the chemical formula

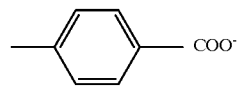

onto the surface of the carbon black.

Pigment Dispersion 3:

After 10 g of carbon black having a surface area of 230 m$^2$/g and a DBP oil absorption of 70 ml/100 g and 3.06 g of 3-amino-N-ethylpyridinium bromide were thoroughly mixed with 72 g of water, 1.62 g of nitric acid was added dropwise to the mixture, followed by stirring at 70° C. After several minutes, a solution of 1.07 g of sodium nitrite in 5 g of water was further added to the mixture, and the resultant mixture was stirred for an additional 1 hour. The resultant slurry was filtered through Toyo Filter Paper No. 2 (product of Advantes Co.), and the resultant pigment particles were fully washed with water and dried in an oven controlled to 110° C. Additional water was added to the dried pigment to prepare an aqueous dispersion of the pigment having a pigment concentration of 10%. The above-described process was followed to introduce a group represented by the chemical formula

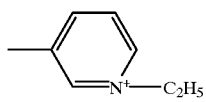

onto the surface of the carbon black.

EXAMPLE 1

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 1 described above | 30 parts |
| Compound A which will be described subsequently; 1% aqueous solution | 0.32 parts |
| Thiodiglycol | 6 parts |
| Diethylene glycol | 6 parts |
| Triethylene glycol | 7 parts |
| Water | 50.68 parts. |

EXAMPLE 2

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 2 described above | 30 parts |
| Compound A which will be described subsequently; 1% aqueous solution | 0.64 parts |
| Polyethylene glycol (molecular weight: 400) | 6 parts |
| Glycerol | 5 parts |
| Ethylene glycol | 5 parts |
| Water | 53.36 parts. |

EXAMPLE 3

The following components were mixed and thoroughly stirred into a solution. The resultant solution was then filtered under pressure through a microfilter (product of Fuji Photo Film Co., Ltd.) having a pore size of 3.0 μm, thereby preparing an ink according to the present invention.

| | |
|---|---|
| Pigment Dispersion 3 described above | 30 parts |
| Compound A which will be described subsequently; 1% aqueous solution | 1.28 parts |
| Polyethylene glycol (molecular weight: 400) | 6 parts |
| Triethylene glycol | 6 parts |
| Thiodiglycol | 6 parts |
| Water | 50.72 parts. |

(Compound A)

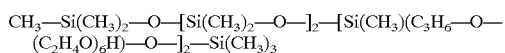

Molecular weight: 1074.

COMPARATIVE EXAMPLE 1

The following components were mixed and thoroughly stirred into a solution. The resultant solution was then filtered under pressure through a microfilter (product of Fuji Photo Film Co., Ltd.) having a pore size of 3.0 μm, thereby preparing a comparative ink.

| | |
|---|---|
| Pigment Dispersion 1 described above | 30 parts |
| Thiodiglycol | 6 parts |
| Diethylene glycol | 6 parts |
| Triethylene glycol | 7 parts |
| Water | 51 parts. |

COMPARATIVE EXAMPLE 2

The following components were mixed and thoroughly stirred into a solution. The resultant solution was then filtered under pressure through a microfilter (product of Fuji Photo Film Co., Ltd.) having a pore size of 3.0 μm, thereby preparing a comparative ink.

| | |
|---|---|
| Pigment Dispersion 2 described above | 30 parts |
| Polyethylene glycol (molecular weight: 400) | 6 parts |
| Glycerol | 5 parts |
| Ethylene glycol | 5 parts |
| Water | 54 parts. |

COMPARATIVE EXAMPLE 3

The following components were mixed and thoroughly stirred into a solution. The resultant solution was then filtered under pressure through a microfilter (product of Fuji Photo Film Co., Ltd.) having a pore size of 3.0 μm, thereby preparing a comparative ink.

| | |
|---|---|
| Pigment Dispersion 3 described above | 30 parts |
| Polyethylene glycol (molecular weight: 400) | 6 parts |
| Triethylene glycol | 6 parts |
| Thiodiglycol | 6 parts |
| Water | 52 parts. |

Each of the inks obtained in Examples 1 to 3 and Comparative Examples 1 to 3 was evaluated in the following manner by means of an ink-jet recording apparatus (BJC-4000, trade name, manufactured by Canon Inc.) having an On-Demand type multi-recording head which ejects an ink by applying thermal energy in response to recording signals to the ink. Each of the inks obtained in Examples 1 to 3 and Comparative Examples 1 to 3 was first charged into an ink cartridge of the ink-jet recording apparatus, and the ink cartridge was installed in the ink-jet recording apparatus. A solid pattern of 90,000 pulses/nozzle was then printed, thereby conducting the aging treatment of the recording head. Thereafter, the recording head was fully cooled, and a pattern of the predetermined number of pulses was then printed again. With respect to the ink cartridge after completion of the aging treatment, the quantity of the ink ejected every dot was calculated out from a difference in weight before and after the printing of the pattern of the predetermined number of pulses, thereby finding a standard deviation thereof. The results thereof are shown in Table 1. Incidentally, the drive conditions for the recording head of the ink-jet recording apparatus, namely, an energizing condition for a heater was preset as follows:

Applied voltage: 24 V;

Pulse width: 4.5 µs; and

Drive frequency: 6.25 kHz.

TABLE 1

| Sample No. | Ex. 1 (ng/dot) | Ex. 2 (ng/dot) | Ex. 3 (ng/dot) | Comp. Ex. 1 (ng/dot) | Comp. Ex. 2 (ng/dot) | Comp. Ex. 3 (ng/dot) |
|---|---|---|---|---|---|---|
| 1 | 81.4 | 88.4 | 82.1 | 83.2 | 80.6 | 85.4 |
| 2 | 86.2 | 87.0 | 84.7 | 85.6 | 74.6 | 77.1 |
| 3 | 84.8 | 89.7 | 80.8 | 82.4 | 83.0 | 75.9 |
| 4 | 82.7 | 84.2 | 83.5 | 77.8 | 83.2 | 74.2 |
| 5 | 82.9 | 82.1 | 83.8 | 75.4 | 82.2 | 75.4 |
| 6 | 85.8 | 86.8 | 83.2 | 89.2 | 78.8 | 78.0 |
| 7 | 88.4 | 86.4 | 86.0 | 75.8 | 76.8 | 81.1 |
| 8 | 86.1 | 84.2 | 82.4 | 73.2 | 89.7 | 89.0 |
| 9 | 85.7 | 87.3 | 86.5 | 85.6 | 76.8 | 72.0 |
| 10 | 89.4 | 84.1 | 88.9 | 84.4 | 88.8 | 84.0 |
| Average | 85.3 | 86.0 | 84.2 | 81.3 | 81.5 | 79.2 |
| Standard deviation | 2.50 | 2.32 | 2.40 | 5.34 | 5.01 | 5.47 |

What is claimed is:

1. A pigment ink comprising self-dispersing carbon black to the surface of which at least one hydrophilic group is bonded through another atomic group, an aqueous medium, and an organic silicon compound, the organic silicon compound being a silicon-containing surfactant.

2. The pigment ink according to claim 1, wherein the atomic group is a linear or branched alkylene group having 1 to 12 carbon atoms, a substituted or unsubstituted phenylene group, or a substituted or unsubstituted naphthylene group.

3. The pigment ink according to claim 1, wherein the hydrophilic group is at least one selected from the group consisting of the following groups:

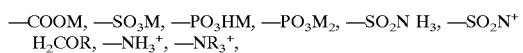

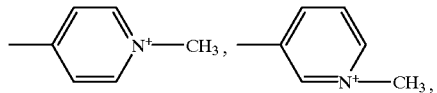

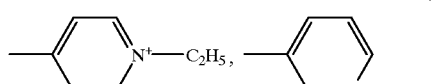

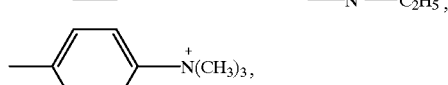

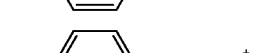

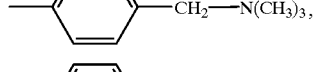

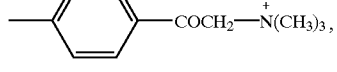

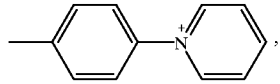

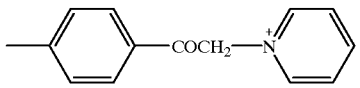

wherein M is hydrogen, alkali metal, ammonium or organic ammonium, and R is an alkyl group having 1 to 12 carbon atoms, a substituted or unsubstituted phenyl group, or a substituted or unsubstituted naphthyl group.

4. An ink-jet recording process, comprising the steps of:
   providing a pigment ink;
   applying energy to the pigment ink; and
   ejecting the pigment ink from an orifice toward a recording medium,
   wherein the pigment ink comprises self-dispersing carbon black to the surface of which at least one hydrophilic group is bonded through another atomic group, an aqueous medium, and an organic silicon compound, the organic silicon compound being a silicon-containing surfactant.

5. The ink-jet recording process according to claim 4, wherein the atomic group is a linear or branched alkylene group having 1 to 12 carbon atoms, a substituted or unsubstituted phenylene group, or a substituted or unsubstituted naphthylene group.

6. The ink-jet recording process according to claim 4, wherein the hydrophilic group is at least one selected from the group consisting of the following groups:

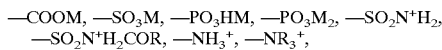

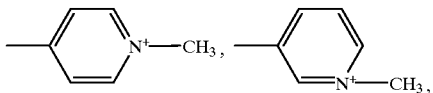

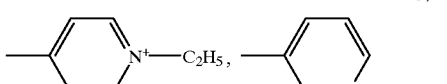

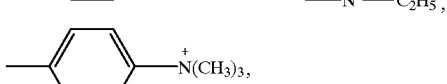

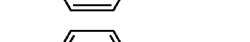

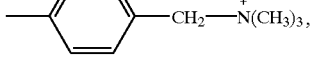

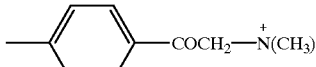

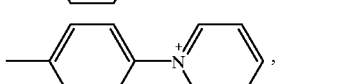

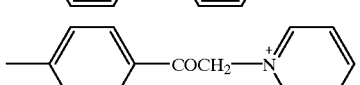

wherein M is hydrogen, alkali metal, ammonium or organic ammonium, and R is an alkyl group having 1 to 12 carbon atoms, a substituted or unsubstituted phenyl group, or a substituted or unsubstituted naphthyl group.

7. The ink-jet recording process according to claim 4, wherein the energy is thermal energy.

8. A recording unit comprising an ink container portion containing an ink, and a head portion from which the ink is ejected, wherein said ink is a pigment ink comprising self-dispersing carbon black to the surface of which at least one hydrophilic group is bonded through another atomic group, an aqueous medium, and an organic silicon compound, the organic silicon compound being a silicon-containing surfactant.

9. An ink cartridge comprising an ink container portion containing an ink, wherein said ink is a pigment ink comprising self-dispersing carbon black to the surface of which at least one hydrophilic group is bonded through another atomic group, an aqueous medium, and an organic silicon compound, the organic silicon compound being a silicon-containing surfactant.

10. The ink cartridge according to claim 9, which is equipped with a means for feeding the ink to a recording head for applying energy to the ink to eject the ink from an orifice.

11. An ink-jet recording apparatus comprising a recording unit, wherein the recording unit has an ink container portion containing a pigment ink, and a recording head for applying energy to the pigment ink to eject from an orifice, wherein the pigment ink comprises self-dispersing carbon black to the surface of which at least one hydrophilic group is bonded through another atomic group, an aqueous medium, and an organic silicon compound, the organic silicon compound being a silicon-containing surfactant.

12. An ink-jet recording apparatus comprising an ink cartridge equipped with an ink container portion which contains a pigment ink, and a recording head for applying energy to the pigment ink to eject the ink from an orifice, wherein the pigment ink comprises self-dispersing carbon black to the surface of which at least one hydrophilic group is bonded through another atomic group, an aqueous medium, and an organic silicon compound, the organic silicon compound being a silicon-containing surfactant.

13. The ink-jet recording apparatus according to claim 12, which is equipped with an ink-feeding means for feeding the ink contained in the ink cartridge to the recording head.

14. The ink-jet recording apparatus according to claim 11 or 12, wherein the energy is thermal energy.

15. The ink-jet recording apparatus according to claim 11 or 12, wherein the recording head is equipped with a heater as a means for applying the energy to the ink.

16. An ink for bubble-jet recording, comprising self-dispersing carbon black to the surface of which at least one hydrophilic group is bonded through another atomic group, an aqueous medium, and an organic silicon compound, wherein the organic silicon compound is a silicon-containing surfactant.

17. A bubble-jet recording process comprising the steps of:

providing an ink comprising self-dispersing carbon black to the surface of which at least one hydrophilic group is bonded through another atomic group, an aqueous medium, and an organic silicon compound, the organic silicon compound being a silicon-containing surfactant; and ejecting the ink.

18. A process for alleviating fluctuation of the amount of ink discharged from an orifice when discharging an ink by a bubble-jet process, including a step of applying thermal energy to an ink, wherein the ink comprises self-dispersing carbon black to the surface of which at least one hydrophilic group is bonded through another atomic group, an aqueous medium, and an organic silicon compound, the organic silicon compound being a silicon-containing surfactant.

* * * * *

UNITED STATES PATENT AND TRADEMARK OFFICE
CERTIFICATE OF CORRECTION

PATENT NO.    : 6,221,141 B1
DATED         : April 24, 2001
INVENTOR(S)   : Yoichi Takada et al.

It is certified that error appears in the above-identified patent and that said Letters Patent is hereby corrected as shown below:

Column 4,
Line 36, "—$SO_2N$ +$H_3$," should read -- —$SO_2N^+H_3$, --.

Column 6,
Line 15, "water-base" should read -- water-based --.

Column 7,
Line 34, "group," should read -- groups, --.

Column 8,
Line 3, "having a" should read -- having --.
Line 59, after "at" insert -- the --.
Line 60, "the" (first occurrence) should be deleted.

Column 9,
Line 61, "weight, and % by weight" should read -- weight and % by weight, --.

Column 13,
Line 42, "—$SO_2N$ $H_3$," should read -- —$SO_2N^+H_3$, --.

Column 14,
Line 30, "—$SO_2N^+H_2$," should read -- —$SO_2N^+H_3$, --.

Signed and Sealed this

Nineteenth Day of November, 2002

*Attest:*

*Attesting Officer*

JAMES E. ROGAN
*Director of the United States Patent and Trademark Office*